US006639353B1

(12) United States Patent
Chadha

(10) Patent No.: US 6,639,353 B1
(45) Date of Patent: Oct. 28, 2003

(54) SUSPENSIONS AND METHODS FOR DEPOSITION OF LUMINESCENT MATERIALS AND ARTICLES PRODUCED THEREBY

(75) Inventor: Surjit S. Chadha, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 183 days.

(21) Appl. No.: 09/649,537

(22) Filed: Aug. 28, 2000

Related U.S. Application Data

(62) Division of application No. 08/915,006, filed on Aug. 20, 1997, now Pat. No. 6,171,464.

(51) Int. Cl.[7] .............................. H01J 1/62; C25D 13/02
(52) U.S. Cl. .................... 313/496; 313/495; 204/490; 204/491; 427/64; 252/301.4
(58) Field of Search ................................. 313/495, 496; 204/490, 491; 427/64; 252/301.4

(56) References Cited

U.S. PATENT DOCUMENTS

| | | | |
|---|---|---|---|
| 5,210,472 A | 5/1993 | Casper et al. ............... 315/349 |
| 5,372,973 A | 12/1994 | Doan et al. .................. 437/228 |
| 5,378,962 A | 1/1995 | Gray et al. .................. 313/495 |
| 5,531,880 A | 7/1996 | Xie et al. .................... 204/478 |
| 5,536,383 A | 7/1996 | Van Danh et al. .......... 204/490 |
| 5,577,943 A | 11/1996 | Vickers et al. ................ 445/24 |
| 5,582,703 A | 12/1996 | Sluzky et al. ............... 204/485 |
| 5,593,562 A | * 1/1997 | Vickers .................. 204/192.32 |
| 5,611,719 A | * 3/1997 | Vickers et al. .............. 313/496 |
| 5,635,048 A | 6/1997 | Lu et al. ..................... 204/490 |
| 5,662,831 A | * 9/1997 | Chadha ............... 252/301.4 R |
| 5,853,554 A | 12/1998 | Bojkov et al. .............. 204/491 |
| 6,004,686 A | * 12/1999 | Rasmussen et al. ........ 313/506 |

* cited by examiner

Primary Examiner—Ashok Patel
Assistant Examiner—Sikha Roy
(74) Attorney, Agent, or Firm—Mueting, Raasch & Gebhardt, P.A.

(57) ABSTRACT

The present invention provides suspensions and methods for depositing luminescent materials (e.g., phosphors) using electrophoresis, particularly during the preparation of display devices, such as field emission display devices, and the articles produced thereby. The luminescent material is deposited onto a substrate having thereon a metal-containing transparent, conductive coating. The suspension includes a nonaqueous liquid, a luminescent material, and a salt of a metal of the transparent, conductive coating.

18 Claims, 2 Drawing Sheets

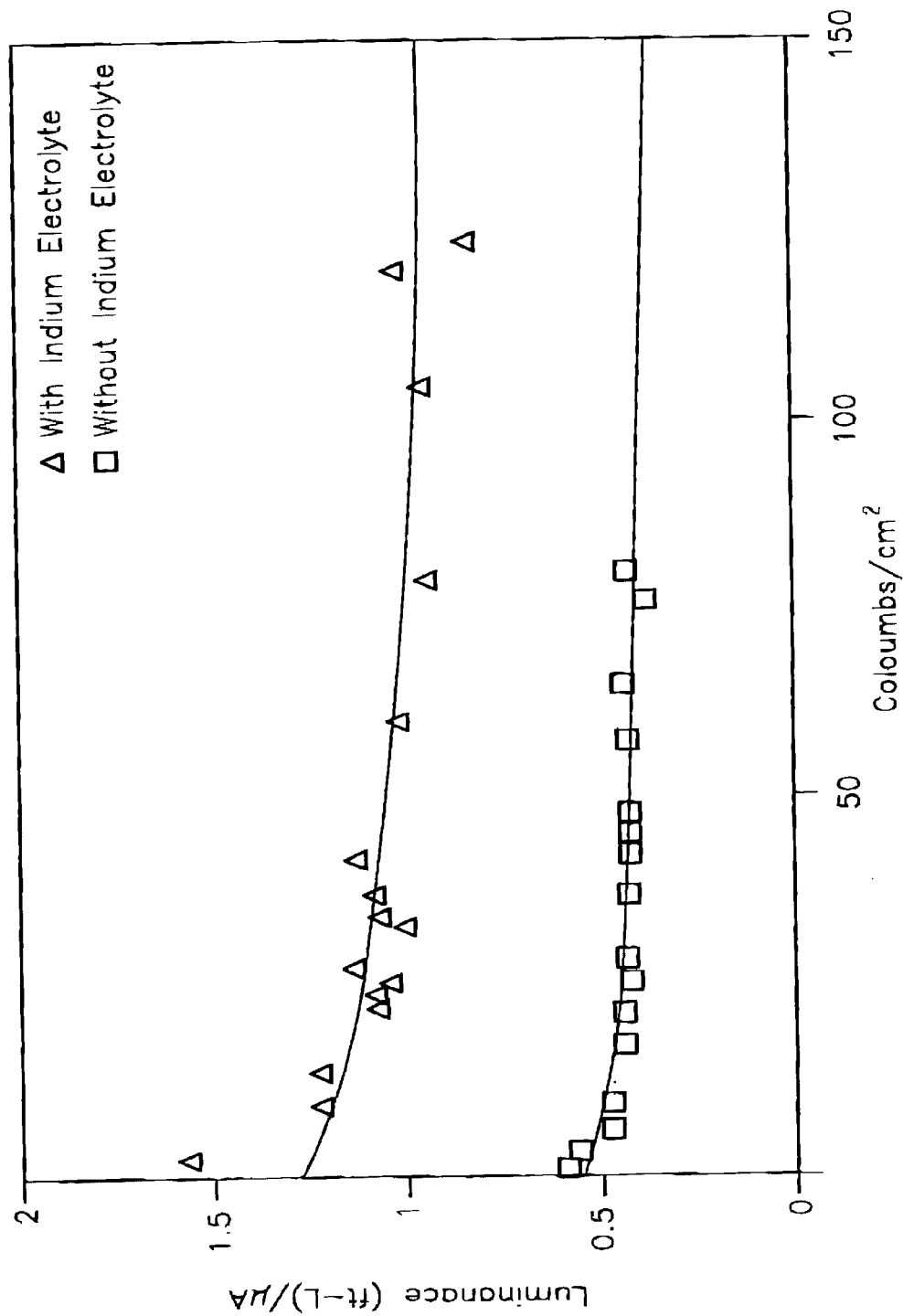

SUSPENSIONS AND METHODS FOR DEPOSITION OF LUMINESCENT MATERIALS AND ARTICLES PRODUCED THEREBY

This application is a division of application Ser. No. 08/915,006 filed Aug. 20, 1997 now U.S. Pat. No. 6,171,464.

STATEMENT OF GOVERNMENT RIGHTS

This invention was made with U.S. Government grant support under Contract No. DABT 63-93-C-0025 awarded by Advanced Research Projects Agency. The U.S. Government has certain rights in this invention.

FIELD OF THE INVENTION

The present invention is directed to suspensions of luminescent materials (e.g., phosphors) and to methods for depositing layers of these materials, particularly during the preparation of display devices, such as field emission display devices, and the articles produced thereby.

BACKGROUND OF THE INVENTION

Display devices, such as desk-top computer screens and direct view and projection television sets, include electron excited cathodoluminescent display devices such as cathode ray tubes. Cathode ray tubes (CRTs) function as a result of a scanning electron beam from an electron gun impinging on phosphors on a relatively distant glass screen. The phosphors absorb the energy from the electron beam and subsequently emit a-portion of the energy, which is typically in the visible region of the electromagnetic spectrum. This visible emission is then transmitted through the glass screen to the viewer. Other display devices, such as field emission displays for use in flat panel display screens, which include cold cathode emission devices, and vacuum fluorescent displays for use in handheld calculators, which include hot cathode emission devices, also function as a result of electrons exciting phosphors on a screen.

Phosphors are inorganic or organic luminescent materials that may include "activator" atoms that can modify the emitted radiation, such that the emission is in the visible region, as well as modify the emission intensity and the persistence of the image. Phosphors should preferably be capable of maintaining luminescence (e.g., fluorescence) under excitation for a relatively long period of time (e.g., about 5 milliseconds) to provide superior image reproduction. Also, in general, it is desirable to produce highly pure phosphors to increase absorption of the available excitation energy by the activator that emits the required radiation, rather than being consumed by other impurities or "killer" centers, which would result in lower luminescence and lower efficiency. Therefore, the quality of the deposited phosphor is an important parameter.

Typically, in field emission displays, powder electroluminescent cells, and other electroluminescent articles, the phosphor is deposited on an insulating substrate coated with a transparent, conductive material such as of indium tin oxide (ITO). A method for producing deposits of phosphors (typically, separate tracks of red, green, and blue phosphors) is electrophoresis (i.e., electrophoretic deposition). In electrophoresis, phosphor particles are deposited from a suspension under the action of an electric field. The suspension typically includes a nonaqueous liquid, such as an alcohol, and an electrolyte, such as a salt of yttrium, aluminum, lanthanum, or thorium. Such metal salts make it possible to electrically charge the phosphor particles and serve as a binder making it possible to obtain a highly adhesive coating. The part coated can serve either as the anode (anaphoresis) or cathode (cataphoresis).

Certain electrophoretic deposition methods result in non-reproducible and inhomogeneous phosphor layers. Others result in the underlying coating (e.g., indium tin oxide) losing its transparency or otherwise being deteriorated as by discoloration and reduced conductivity. U.S. Pat. No. 5,536,383 (Van Danh et al.) discloses a method that avoids these problems; however, this method uses a suspension that includes an aliphatic alcohol (except methanol), a powdered luminescent material, a meta salt, as well as other organic materials such as nitromethane and a vegetable protein. The metal salts can be salts of rare earth and alkaline earth metals. They can also be thorium, aluminum and/or cobalt salts. Preferably, they are hydrated nitrate salts of Mg, La, Al, Th, and Co.

There is a need for other electrophoretic deposition methods that are simpler and substantially eliminate the deterioration (e.g., discoloration and reduced, conductivity) of the transparent, conductive coating.

SUMMARY OF THE INVENTION

The present invention provides suspensions and methods for depositing luminescent materials by electrophoresis: Thus, in one embodiment, the invention is directed to a suspension for the deposition of a luminescent layer onto a substrate having thereon a metal-containing transparent, conductive coating, the suspension comprising a nonaqueous liquid, a luminescent material, and a salt of a metal of the transparent, conductive coating.

In another embodiment of the invention, a suspension is provided for the deposition of a luminescent layer onto a substrate having thereon a metal-containing transparent, conductive coating comprising indium tin oxide, the suspension comprising, a polar organic liquid, a dielectric phosphor, and a salt of a metal of the, transparent, conductive coating.

In yet another embodiment of the invention, a method for depositing a luminescent layer on a substrate having thereon a metal-containing transparent, conductive coating is provided. The method includes: providing a suspension comprising a nonaqueous liquid, a luminescent material, and a salt of a metal of the transparent conductive coating; and depositing (i.e., coating) the suspension onto the substrate to form a layer of luminescent material.

Another method for depositing a luminescent layer on a substrate having thereon a metal-containing transparent, conductive coating comprising indium tin oxide is provided. The method includes: providing a suspension comprising, a polar organic liquid, a dielectric phosphor, and a salt of a metal of the transparent, conductive coating; and depositing the suspension onto the substrate to form a layer of luminescent material.

The present invention also provides coated substrates and field emission display devices. In one embodiment, a field emission display device comprises a substrate having thereon a metal-containing transparent, conductive coating, and further having deposited thereon a luminescent material, and an oxide of a metal of the transparent, conductive coating.

In another embodiment, a field emission display device comprises a substrate having thereon a metal-containing transparent, conductive coating comprising indium tin oxide, and further having deposited thereon; a dielectric phosphor, and an oxide of a metal of the transparent, conductive coating.

Also provided is a substrate comprising a metal-containing transparent, conductive coating on at least one surface of the substrate, and a layer of luminescent material deposited on the metal-containing transparent, conductive coating, wherein the layer of luminescent material comprises an oxide of a metal of the transparent, conductive coating.

In another embodiment, a substrate is provided that comprises a metal-containing transparent, conductive coating on at least one surface of the substrate, and a layer of dielectric phosphor deposited on the metal-containing transparent, conductive coating, wherein the layer of dielectric phosphor comprises an oxide of a metal of the transparent, conductive coating.

Yet another embodiment provides a substrate comprising a metal-containing transparent, conductive coating on at least one surface of the substrate, and a layer of luminescent material deposited on the metal-containing transparent, conductive coating, wherein the metal-containing transparent conductive coating comprises indium tin oxide and the layer of luminescent material comprises an oxide of a metal of the transparent, conductive coating.

BRIEF DESCRIPTION OF THE DRAWING

FIG. 2 is a graph of the luminance of a luminescent material deposited on an indium tin oxide conductive coating with and without an indium salt.

DETAILED DESCRIPTION

Figure 1:
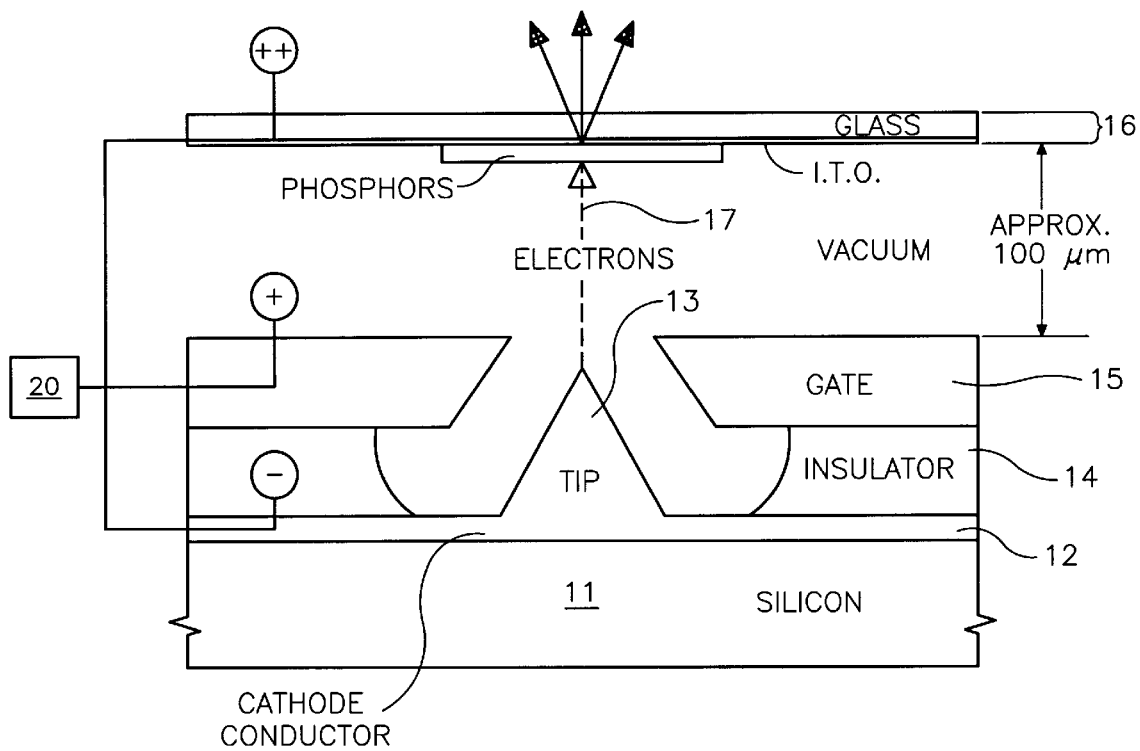
FIG. 1 is a cross-sectional schematic of field emission display device that includes phosphors made by the method of the present invention.

The present invention provides suspensions and methods for depositing luminescent materials, particularly dielectric phosphors and semiconductive phosphors, onto a substrate in the preparation of field emission displays, powder electroluminescent cells, and the like. The suspensions and methods of the present invention are advantageous because they reduce or substantially eliminate the deterioration (e.g., reduced transparency and conductivity) of display devices.

The substrate on which the luminescent material is deposited is a transparent, insulating substrate, having a metal-containing transparent, conductive coating thereon. A preferred transparent, insulating substrate is glass. The transparent conductive coating is one of indium tin oxide (ITO), tin oxide, cadmium oxide, zinc oxide; and the like. Preferably, the transparent conductive coating is indium tin oxide or tin oxide. More preferably, the transparent conductive coating is indium tin oxide.

The method involves the use of a suspension of particles of a luminescent material in a nonaqueous liquid. The luminescent material can be a wide variety of materials capable of being produced in particulate form. Typical luminescent materials are phosphors. Particularly suitable phosphors for use in field emission displays, for example, are dielectric (nonconducting) phosphors. Examples of such phosphors include, but are not limited to, manganese- and arsenic-activated zinc silicate (P39 phosphor), titanium-activated zinc silicate (P52 phosphor), manganese-activated zinc silicate (P1 phosphor), cerium-activated yttrium silicate (P47 phosphor), manganese-activated magnesium silicate (P13 phosphor), lead- and manganese-activated calcium silicate (P25, phosphor), terbium-activated yttrium silicate, terbium-activated yttrium oxide, terbium-activated yttrium aluminum oxide (P53 phosphor), terbium-activated gadolinium oxide, terbium-activated yttrium aluminum gallium oxide, and the like. These materials are typically of a particle size of less than about 20 microns ($\mu$m), but often less than about 10 microns, and preferably, less than about 5 microns, although larger sized particles can be produced and milled to a smaller particle size. The luminescent material (or mixture of various luminescent materials) is typically present in the suspension in an amount of less than about 10 grams/liter, although larger amounts are possible as long as a generally stable dispersion is produced with little or no sedimentation. Typically, at least about 1 gram/liter luminescent material (or mixture of luminescent materials) is present in the suspension.

The nonaqueous liquid used to prepare the suspensions of the present invention can be a wide variety of liquids commonly used in the electrophoretic deposition of phosphors. These include, but are not limited to, polar organic liquids such as alcohols (e.g., methanol, ethanol, isopropanol), ketones (e.g., acetone), and aldehydes (e.g., acetaldehyde). Trace amounts of water may be present in the organic liquids. Significantly, other organic materials are not needed for the preparation of field emission display devices to avoid the adverse results of conventional electrophoresis deposition methods. For example, organic materials such as nitromethane and vegetable proteins are not needed in the suspensions and methods of the present invention for advantage to be realized.

The suspension advantageously includes a salt of one or more of the metals of the transparent, conductive coating. For example, if the transparent, conductive coating is indium tin oxide, the metal salt can be a salt of indium and/or a salt of tin. If the transparent, conductive coating is tin oxide, the metal salt can be a salt of tin. If the transparent, conductive coating is zinc oxide, the metal salt can be a salt of zinc. Such metal salts include counterions that allow for the salts to be solubilized in polar organic liquids. Typically, and preferably, the nitrate counterions are used, although other counterions, such as chloride, may also be used. This metal salt primarily serves as an electrolyte to increase the conductivity of the suspension, thereby decreasing the voltage necessary for deposition, and to provide the phosphor with a net positive charge. The metal salt can also serve as an inorganic binder for improving the adhesion of the deposited luminescent material to the underlying transparent, conductive coating.

The use of a salt of one of the metals of the transparent, conductive coating provides advantage over conventional electrophoretic deposition methods. It has been discovered that the use of such a metal salt substantially eliminates the deterioration (e.g., discoloration and reduced conductivity) of the transparent, conductive coating. This is accomplished without the need for nitromethane or a vegetable protein, which are undesirable because these can lead to large deposits of organic materials in an electrophoretically deposited layer. The metal salt (or mixture of metal salts) is typically present in the suspension in an amount effective to provide a desirably conductive suspension. Preferably, the metal salt (or mixture of metal salts) is present in the suspension in an amount of at least about $1 \times 10^{-5}$ mole/liter. Preferably, the metal salt (or mixture of salts) is present in the suspension in an amount of no greater than about $1 \times 10^{-4}$ mole/liter. For introducing the metal salt (or mixture of metal salts) into the nonaqueous liquid (e.g., polar organic liquid), the metal salt can be initially dissolved in a very small amount of water, although this is not necessarily required, particularly if the metal salt crystal lattice includes molecules of hydration and/or if the nonaqueous liquid includes a small amount of water (such as occurs with isopropanol).

The present invention also provides methods for depositing luminescent layers, particularly phosphor layers, onto an electrically insulating, transparent substrate having a metal-containing conductive, transparent coating thereon. The methods of the present invention preferably involve deposition (i.e., coating) of a luminescent material using standard eletrophoretic techniques, although other techniques can be used. In cataphoresis, for example, the method involves depositing a luminescent material from a suspension of the luminescent material by applying a suitable voltage (typically about 1–40 volts/cm, which may be constant or pulsed) between an anode and a cathode. The coated substrate is used as the cathode. The anode can be provided by a wide variety of materials, such as platinum or stainless steel, for example. Typically, the luminescent materials are deposited in an amount to produce a layer ranging in thickness from about 3 microns to about 5 microns.

The suspensions and methods described herein can be used for depositing a wide variety of luminescent materials in a wide variety of display devices. Although the suspensions and methods of the present invention are particularly suitable for use in the preparation of field emission displays, they can be used to prepare a variety of other electron excited fluorescent display devices, such as a standard CRT. These displays can be used for virtual reality screens, book video screens, head-mounted display devices, and the like. Typically, dielectric (nonconductive) phosphors are used on the metal-containing transparent, conductive coating (e.g., ITO) of such devices, instead of conductive phosphors. Although conductive phosphors are more desirable for field emission displays because they eliminate charge build-up, dielectric phosphors are normally used due to the limited availability of conductive phosphors.

An additional and unexpected advantage of the suspensions and methods of the present invention is that they produce a conductive oxide on the luminescent material that allows for any excess charge that builds up on the luminescent material to leak away. For example, if indium tin oxide is the transparent, conductive coating on which the luminescent material (e.g., phosphors) is deposited, and indium nitrate is the salt used in the suspension to deposit the luminescent material, at least some indium hydroxide, formed at the cathode during electrophoretic deposition, will deposit as well. The indium hydroxide is deposited on at least a portion of the particles of the luminescent material, and typically in at least some of the voids between the luminescent particles. Indium hydroxide converts to indium oxide upon thermal treatment. The indium hydroxide is typically heated to over 300° C. to convert it, preferably completely, to indium oxide. For example, it can be heated to 700° C. for 2 hours in a belt furnace. This heating step (i.e., firing) is typically carried out in air, although subsequently as is typically done, the screens are baked in a vacuum at about 10–8 torr and 500° C. for about 10 hours to eliminate volatile impurities. Some reduction of the surface of the oxide is expected to occur during this subsequent step, which will enhance the surface conductivity of the indium oxide.

Thus, at least a portion of the layer of the luminescent material includes a metal oxide, which may be coated on the particles and/or between the particles. Such metal oxides, such as indium oxide, are conductive, thereby allowing for leakage of excess charge that builds up on the luminescent material (e.g., dielectric phosphors) when it is used in display devices. This is advantageous because the build up of charge on the dielectric phosphors leads to negatively charged coated substrates, which repel electrons, hence reducing the light output from the dielectric phosphors.

The present invention also provides display devices, particularly field emission display devices, that are more efficient at low voltage, high current modes. Field emission displays typically include a display panel having a transparent gastight envelope, and two main planar electrodes arranged within the gas-tight envelope parallel with each other. One of the two main electrodes is a cold cathode with a grid, and the other is an anode. The anode may consist of a transparent glass plate, a transparent electrode formed on the transparent glass plate, and a phosphor layer coated on the transparent electrode. Devices such as this are further disclosed in U.S. Pat. Nos. 5,210,472, 5,372,973, and 5,577,943, for example.

A portion of a field emission display employing a cold cathode is shown in FIG. 1, for example. Referring to this figure, substrate 11 can be made of glass, for example, or a variety of other suitable materials. Preferably, a single crystal silicon layer serves as substrate 11 onto which a conductive material layer 12, such as doped polycrystalline silicon, has been deposited. At a field emission site location, a conical micro-cathode 13 has been constructed on top of substrate 11. Surrounding the micro-cathode 13, is a low potential anode gate structure 15. When a voltage differential, through source 20, is applied between the cathode 13 and the gate 15, a stream of electrons 17 is emitted toward anode plate 16. The electron emission tip 13 is integral with the single crystal semiconductor substrate 11, and serves as a cathode conductor. Gate 15 serves as a low potential anode or grid structure for its respective cathode 13. A dielectric insulating layer 14 is deposited on the conductive cathode layer 12, and has an opening at the field emission site location.

Anode plate 16 includes a transparent, electrically conductive coating deposited on an insulating transparent substrate, which is positioned facing gate electrode and parallel thereto. The conductive coating is on the surface of the substrate directly facing gate electrode. The conductive coating may be in the form of a continuous layer on the surface of the substrate. Alternatively, it may be in the form of parallel and electrically isolated stripes or bands on the surface of the substrate. Anode plate 16 also includes a luminescent layer deposited over the conductive coating so as to be directly facing and immediately adjacent gate electrode.

Field emission display devices produced by depositing a luminescent layer which contains the salt of the metal in the conductive coating on an insulating transparent substrate having a conductive coating were two times more efficient at light output than standard displays. See, for example, FIG. 2, which is a graph of the luminance relative to coloumbs/$cm^2$, of a luminescent material deposited an ITO coating on with and without the use of an indium salt (i.e., electrolyte).

The complete disclosure of all patents, patent documents, and publications cited herein are incorporated by reference. The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. A field emission display device comprising substrate having thereon a metal-containing transparent, conductive coating, and a luminescent layer deposited from a suspension comprising:

a nonaqueous liquid;

a luminescent material; and a salt of a metal of the transparent conductive coating, wherein the salt is present in the suspension at a concentration of no greater than about $1 \times 10^{-4}$ mole/liter.

2. The device of claim 1 wherein the luminescent layer reduces the deterioration of the transparent conductive coating.

3. The device of claim 1 wherein the luminescent material is a phosphor.

4. The device of claim 1 wherein the metal-containing transparent, conductive coating comprises indium tin oxide.

5. The device of claim 1 wherein the salt comprises a salt of indium.

6. The device of claim 5 wherein the indium salt is indium nitrate.

7. The device of claim 1 wherein the nonaqueous liquid is a polar organic liquid.

8. The device of claim 1 wherein the suspension is heat treated to form an oxide on at least a portion of the luminescent material.

9. The device of claim 1 wherein the salt of a metal of the transparent, conductive coating is present in the suspension at a concentration of at least about $1 \times 10^{-5}$ mole/liter.

10. The device of claim 1 wherein the salt of a metal of the transparent, conductive coating is selected to substantially eliminate deterioration of the transparent, conductive coating.

11. The device of claim 1 wherein the luminescent material comprises luminescent particles and a metal oxide coated on the particles, between the particles, or both.

12. A field emission display device comprising a substrate having thereon a metal-containing transparent, conductive coating layer of a luminescent material deposited from a suspension comprising:

a polar organic liquid;

a dielectric phosphor; and a salt of a metal of the transparent, conductive coating, wherein the salt is present in the suspension at a concentration of no greater than about $1 \times 10^{-4}$ mole/liter.

13. The device of claim 12 wherein the luminescent layer of material comprises dielectric phosphor particles and a metal oxide coated on the particles, between the particles, or both.

14. A substrate for use in a field emission display device, the substrate having thereon a metal-containing transparent, conductive coating and a layer of luminescent material deposited from a suspension comprising:

a nonaqueous liquid;

a luminescent material; and a salt of a metal of the transparent conductive coating, wherein the salt is present in the suspension at a concentration of no greater than about $1 \times 10^{-4}$ mole/liter.

15. The substrate of claim 14 wherein the luminescent material is a dielectric phosphor.

16. The substrate of claim 15 wherein the dielectric phosphor comprises particles having a size of less than about 20 microns.

17. The substrate of claim 16 wherein the dielectric phosphor comprises particles having a size of less than about 10 microns.

18. The substrate of claim 14 wherein the salt is selected to provide the luminescent material with a net positive charge.

* * * * *

UNITED STATES PATENT AND TRADEMARK OFFICE
CERTIFICATE OF CORRECTION

PATENT NO. : 6,639,353 B1  Page 1 of 1
DATED : October 28, 2003
INVENTOR(S) : Chadha It is certified that error appears in the above-identified patent and that said Letters Patent is hereby corrected as shown below:

<u>Column 1,</u>
Line 32, please delete "a-portion" and insert -- a portion --

Signed and Sealed this

Thirteenth Day of April, 2004

JON W. DUDAS
*Acting Director of the United States Patent and Trademark Office*